May 26, 1925. Re. 16,087
L. A. M. PHELAN
SWITCH
Original Filed Aug. 20, 1920
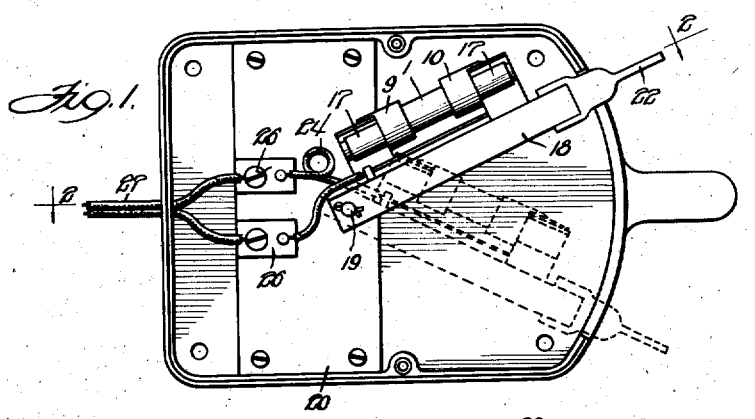
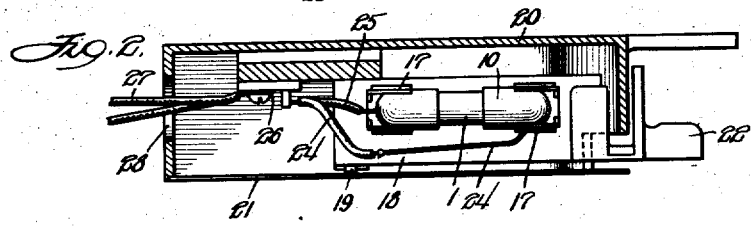
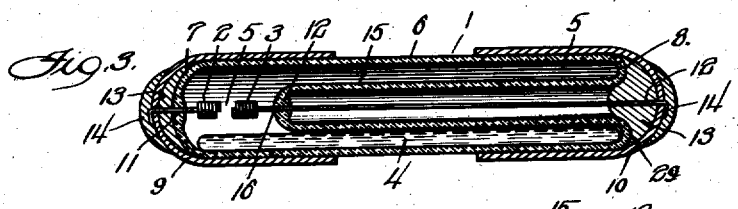
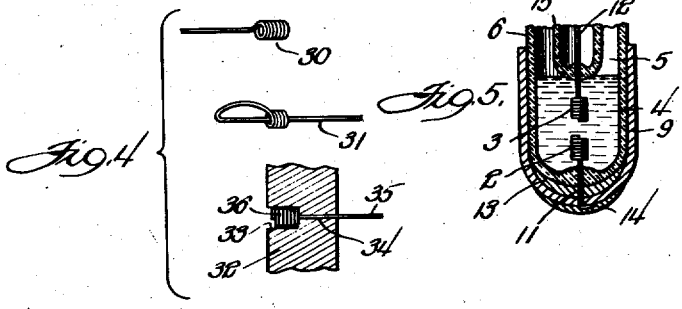
Witness:
W. K. Olson
Inventor:
LOUIS A. M. PHELAN
By Jones, Addington, Ames & Seibold
Attys.

Reissued May 26, 1925. Re. 16,087

UNITED STATES PATENT OFFICE.

LOUIS A. M. PHELAN, OF BELOIT, WISCONSIN, ASSIGNOR TO ABSOLUTE CON-TAC-TOR CORPORATION, A CORPORATION OF ILLINOIS.

SWITCH.

Original No. 1,471,199, dated October 16, 1923, Serial No. 404,913, filed August 20, 1920. Application for reissue filed March 16, 1925, Serial No. 16,068.

*To all whom it may concern:*

Be it known that I, LOUIS A. M. PHELAN, a citizen of the United States, residing in Beloit, Wisconsin, have invented certain new and useful Improvements in Switches, of which the following is a specification.

My invention relates to electrical switches and it has special reference to electrical contact making devices comprising spaced electrodes that are sealed into a closed hermetically sealed container and are adapted to be brought into electrical contacting relation with one another through the agency of a movable conducting body, preferably a fluid such as mercury, which is also disposed in said container that, upon being tilted, is instrumental in performing the circuit closing and circuit opening functions between the electrodes and the mercury comprised in the device.

More particularly my invention refers to an electrical contactor device of the character indicated which will operate for long periods of time and serve to make and break comparatively large amounts of current at commercial voltage without undergoing deterioration.

My present invention pertains to an electrical contactor device as described above which, if desired, may comprise a cylindrical elongated tubular member, preferably in the form of a hermetically sealed glass container that serves to house the electrodes and a body of conducting fluid such as mercury, the latter being adapted to bridge the electrodes within the tubular member. The tubular member is normally disposed upon a suitable supporting structure so that it may be tilted in either of two directions and thus allow the conducting fluid to flow into and out of circuit making and opening positions with the electrodes. The electrodes are hermetically sealed in walls of the tubular member and are adjacent to each other, forming a cooperating pair that is disposed at one end of the tubular member. A particular object of this invention is to provide in a contactor device of the type above indicated means for suppressing or eliminating the arcing and for preventing deterioration or corrosion of the contacting parts.

A further object of this invention is to provide a particular form of container for a contactor device of the type indicated which will serve to support the electrodes in such relation thereto that the walls of the container will not become injured after prolonged use of the device.

A further object is to provide an improved form of electrode for use in the contactor of the type indicated. By making the electrodes of concentrated mass, of uniform size, of regular configuration, and high heat absorbing capacity, the contactors may be subjected to service conditions without deterioration and, moreover, may be reproduced with uniformity thereby ensuring their interchangeability and uniform action in the making and breaking of the electric circuit when the contactor is tilted through the same degree.

A still further object of this invention is to provide a contactor device of the type indicated that will be simple and economical to construct and which will possess a long life even when subjected to considerable quantities of electric current and relatively high voltages.

An illustrative embodiment of the invention is shown in the accompanying drawings, in which—

Fig. 1 is a front elevation of an assemblage of a mercury switch mounted on a tilting lever or holder within a housing receptacle, the cover of which is removed, and the switch being in its open circuit position.

Fig. 2 is a sectional view along the line 2—2 of Fig. 1.

Fig. 3 is a vertical axial sectional view of one form of a mercury switch embodying my invention.

Fig. 4 shows three steps in a process of making one form of large contact-making surface terminals that may be disposed in the glass mercury tube of Fig. 3.

Fig. 5 is a vertical axial sectional view of the lower end of the mercury switch of Fig. 3 in an upturned position.

The switch proper comprises a hermetically sealed receptacle 1 having a pair of spaced terminals or electrodes 2 and 3 and a liquid conductor 4 which only partly fills the space within the receptacle. The chamber in the receptacle 1 is substantially free of air but contains an atmosphere of inert gas. This, in combination with the liquid conductor 4, are the only contents of the chamber except the electrodes. I have found that the inclusion of other materials, such as additional liquids to lubricate the passage of the conductor 4 over the inner surface of the receptacle 1 or, supposedly to assist in the suppression of the electric arcs, renders the contactor inoperative by reason of the deterioration and corrosion that is induced. The receptacle 1 is formed in a manner such that the conductor 4 may make or break an electric circuit between said electrodes thereby closing and opening an external electric circuit when the receptacle is suitably moved or tilted. The walls of the receptacle 1 are composed of dielectric material, preferably glass, and comprise an elongated cylindrical body part 6 made in tubular form with its ends 7 and 8 tightly and hermetically sealed and provided with conductive terminal caps 9 and 10 respectively that embrace said body part and from which conductors or leading-in wires 11 and 12 extend to the interior of the chamber, said leading-in wires being hermetically sealed in the glass wall thereby ensuring that the container will remain substantially permanently hermetically sealed when the contactor is subjected to service conditions.

The leading-in wires 11 and 12 where they extend through the walls of the container are of a relatively small cross sectional area, although sufficiently large to conduct the electric current without reaching a dangerously high temperature. The leading-in wires where they are hermetically sealed in the glass container, by possessing small cross sectional area, are of small heat conducting capacity and so the seals will not become unduly heated and thereby crack or break. The leading-in wires 11 and 12 support at their inner ends the electrodes 2 and 3 respectively, which are spaced from each other longitudinally of the container and are disposed at one end thereof. The electrodes 2 and 3 are positioned in proximity to the longitudinal axis of the container but not necessarily on the axis thereof but in the central portion of the container. This permits a small quantity of mercury 4 to be used in the contactor which greatly enhances the lightness of the contactor and permits it to be used in conjunction with mechanisms which are operated by small quantities of energy. Each of the electrodes 2 and 3 constitutes a concentrated mass which readily absorbs the heat generated by the sparks obtaining when the electric circuit is made and broken thereat. Moreover, the electrodes 2 and 3 by severally possessing a concentrated mass, limit the area over which sparks may obtain and, therefore, the electric sparks that may occur at the making and breaking of the electric circuit are confined within a small region because of the limited area possessed by each of the electrodes. The electrodes 2 and 3, by being positioned at one end of the container, ensure that both of the electrodes are not under the influence of the body of mercury 4 when the electric circuit through the contactor is opened. Moreover, in this circumstance, the body of mercury 4 is removed from proximity to the electrodes 2 and 3 thereby ensuring the maximum insulating strength of the contactor when the circuit is opened. For instance, if the contactor is tilted so that the body of mercury 4 is removed from proximity to the electrodes 2 and 3 that are disposed at one end of the container, the body of mercury will be in the neighborhood of the other end of the container thereby completely insulating the electrodes 2 and 3 from each other. By reason of the electrodes 2 and 3 being spaced from each other longitudinally of the container, as the mercury 4 moves to circuit closing position, it first contacts with the electrode 3 and then with the electrode 2. The electric circuit is therefore made between the mercury 4 and the electrode 2 which ensures that the electric arc will be confined to at least one electrode and the mercury, the latter possessing a rectifying or suppressing action thereby minimizing the arc. When the circuit is opened, it is broken again between the mercury and one electrode and the same condition obtains, namely, the circuit is broken between one electrode and the receding body of mercury which "stretches out" the arc and extinguishes it. The electrode 2 is spaced a sufficient distance from the thin wall of the glass container to preclude the electric arcs from breaking the glass wall. When the circuit between the electrode is open, both electrodes are free from the influence of the body of mercury which has receded from them and the full insulating value of the spark gap 5 then exists between the two spaced electrodes.

Each of the end caps 9 and 10 is secured to the glass tube by means of a high-grade and durable cement 13, which preferably may be composed of litharge and glycerine. The outer ends of the conductors 11 and 12 may be secured in place by the application of solder 14 at each end of the switch.

In order that the electrode 3 may be supported with a fair degree of rigidity at or adjacent to the main axis of the switch, the corresponding end of the tube may be formed with an inward tubular projection 15 and the terminal lead 12 is sealed in the closed inner end thereof at 16. As thus mounted, the electrodes 2 and 3 are disposed in axial alinement concentric with the tube 6 and are equally spaced from the walls on all sides. The leading-in wires 11 and 12 project exteriorly from the tube at its ends.

The switch unit 1 as a whole is of a cartridgelike shape and is interchangeable with similar switches in the supporting structure substantially in the manner by which "cartridge" fuses are mounted. When the switch 1 is placed in service, the end caps 9 and 10 fit into corresponding spring clips 17 as shown in Figs. 1 and 2. In one position (Fig. 5) of the switch, the electrodes 2 and 3 are bridged by the mercury 4, but when the switch is horizontally positioned (Fig. 3) or is reversely tilted (Fig. 1, dotted lines) the mercury flows away from the electrodes and the external circuit is consequently opened.

Tilting may be effected and controlled in various ways, but in the form here shown the clips 17 are secured to a hard rubber base 18 which in turn is pivoted at 19 to the back wall of a protective case 20 having a removable cover 21. The base 18 has a handle or lever arm 22 projecting through the casing aperture 23 by which the tilting is controlled. Flexible leads 24 and 25 extend from the clips 17 to fixed terminal blocks 26. From thence leads 27 extend to the outside of the casing 20 through an aperture 28.

One method of constructing the switch is as follows: The tube 6 having been formed and the electrodes 2 and 3 having been secured in place by hermetically sealing them in the glass and the body of mercury 4 having been supplied, the tube together with a number of smaller tubes each provided with an outstanding tubular stem (not shown) and being connected in "tree" form as understood in the art, are exhausted by means of a vacuum pump, after which an inert gas may be introduced and the tube hermetically sealed, the temporary connection or "stem" being removed. The "sealing-off" tip is shown at 29. The body of mercury 4 may be inserted, either before or after exhausting the air, preferably before. The inert gas serves to assist in suppressing the sparks and results in a prolonged life of the terminals. It is to be understood that no other materials or chemicals are to be contained within the container except the mercury, the electrodes and the inert gas, all of which are substantially non-deteriorating in the presence of an electric arc. I am aware that liquids, such as alcohol, distilled water and other liquids have been used in connection with mercury switches with the expectation that such liquids would serve as a lubricant for the body of mercury whereby it would slide with minimum frictional resistance on the glass wall of the container or with the expectation that the liquids would assist in suppressing the arcs. But in such mercury switches the additional liquids cause deterioration in a very short time, thereby rendering the switches totally inoperative under service conditions.

The electrodes 2 and 3 may be formed as illustrated by the three steps shown in Fig. 4. One way of forming an electrode is to take a piece of suitable wire and first form a spiral at one end as shown at 30. Then bend back the straight free end and thread it through the coil, as shown at 31. Then place the coil in the die 32 having a cylindrical cup-like aperture 33 with a central perforation 34 at the bottom for the wire end 35. Then pull the wire end 35 tightly, thereby securely setting the coil head 36 on the end of the wire.

It is essential that the electrodes 2 and 3 be of concentrated mass, as well as of regular configuration in order that the electrodes will not deteriorate when the electric sparks obtain, and in order that the contactors, when made, will be interchangeable and uniform in their action. Therefore, when the term "electrode" is mentioned, I mean that the electrode shall be of concentrated mass, be made of a material having a high heat absorptivity, and be of regular configuration.

If the electrodes 2 and 3 were enlargements only of the sort that might be provided by fusing melted metal or the like upon the ends of the leading-in wires, these electrodes would not possess a regular configuration, nor would they be capable of being produced in uniform sizes. Their exposed surfaces would be irregular, filled with pits or the like and be exceedingly rough. The sparks then obtaining at the electrodes would burn off the projections and cause rapid deterioration of the contactor.

The leading-in wires 11 and 12 may be composed of a different material than that of which the electrodes are composed, but it is essential that the leading-in wires be made of such material that substantially permanently hermetical seals with the glass container are ensured throughout the life of the contactor, because the admission of air into the contactor would render it useless. I have found that certain nickel iron alloys may be used as leading-in wires which provide seals of the aforementioned character. Therefore, where leading-in wires are mentioned, it is understood that these must be of such material that substantially permanently hermetical seals are ensured throughout the life of the contactor.

The inert gas being preferably under pressure provides a high resistance gap between the electrodes 2 and 3. In operation, the mercury and inert gas conduct the heat away from the electrodes and dissipate the heat so that excessive concentration of heat at the electrodes is avoided, even on moderate overloads. The leading-in wires, as mentioned above, are also of small heat conducting capacity in order that the glass seals made therewith will not become unduly heated.

Although but one specific embodiment of this invention has been herein shown and described, it will be understood that many modifications may be made without departing from the spirit and scope of this invention as defined by the following claims.

I claim:

1. An electrical contactor comprising an hermetically sealed tubular glass container, a pair of spaced electrodes disposed at one end thereof and between which the electric circuit is adapted to be made and broken, a leading-in wire fixed to and independently supporting each of said electrodes, and a body of conducting fluid for bridging said electrodes at predetermined times, said leading-in wires extending to the exterior of said container and being permanently hermetically sealed in the walls thereof, the end of said container furthest from said electrodes being depressed inwardly and extended in tubular form towards said electrodes and one of said leading-in wires extending through said inwardly depressed end and hermetically sealed in the inner end thereof.

2. An electrical contactor comprising an hermetically sealed tubular glass container, a reentrant integral tubular closure at one end of said container and extending longitudinally toward the other end thereof, a pair of spaced electrodes within said other end of said container, leading-in wires for said electrodes, said leading-in wires being permanently hermetically sealed in the container wall and one of said leading-in wires extending through said reentrant closure, and a pair of metallic caps fitted upon and cemented respectively to the opposite ends of said container and electrically connected to said leading-in wires.

3. An electrical contactor comprising an hermetically sealed container, a pair of electrodes positioned at one end of said container and spaced from each other longitudinally of the container, leading-in wires hermetically sealing the container and connected to said electrodes, and a body of mercury for bridging said electrodes to make and break the electric circuit thereat at predetermined times, said electrodes being of substantial concentrated mass, of high heat absorbing capacity and of regular configuration, and said leading-in wires where sealed in the walls of said container possessing relatively small cross sections and small heat conducting capacities.

4. An electrical contactor comprising an air evacuated hermetically sealed container, a pair of electrodes of substantial mass positioned centrally at one end of said container and spaced from each other longitudinally of the container, leading-in wires hermetically sealing the container and connected to said electrodes at points spaced from the walls of said container, said leading-in wires having cross sectional areas relatively small with respect to said electrodes, a body of mercury movable in said container for making and breaking the circuit at said electrodes, and an inert gas filling the space in said container not occupied by said electrodes and mercury, said inert gas serving to conduct heat away from said electrodes.

5. In a device of the character described, an elongated hermetically sealed receptacle containing a body of mercury, an electrode member near one end thereof, said electrode member comprising an enlarged head of substantial concentrated mass, of high heat absorbing capacity and of regular configuration at which said body of mercury serves to make and break an electric circuit at predetermined times, said head being spaced centrally in the container and from the walls thereof, and a relatively thin leading-in wire for said enlarged head which is hermetically sealed in the wall of the container and of relatively small cross sectional area.

6. A fluid type contactor switch comprising a body of conducting liquid, and electrode terminals for making and breaking an electrical circuit with said body of conducting liquid at predetermined times, one of the terminals comprising a wire, having an enlargement at the end thereof formed by tightly coiling a portion of said wire.

7. A mercury switch comprising a tubular glass container that is hermetically sealed, a body of mercury in said container, and leading-in wires hermetically sealed in the walls of said container, said leading-in wires having tight set coils of wire on their inner ends, which coils constitute electrodes having large concentrated mass, high heat absorbing capacity and regular configuration.

8. A mercury electric switch comprising an hermetically sealed tubular container, a body of mercury therein, electrodes sealed in said container and each comprising a relatively small leading-in portion that is hermetically sealed in the wall of said container and an enlarged head of regular configuration and of substantial concentrated mass, the said electrode heads being disposed centrally in the container and at one end thereof and spaced from each other longitudinally of the container, said electrode heads providing contact-making areas for said body of mercury which is adapted to make and break the electric circuit at said electrode heads.

9. A mercury electric switch comprising an hermetically sealed tubular container, cooperating electrodes at one end thereof which are severally provided with a relatively small leading-in portion that is permanently hermetically sealed in the wall of said container and a terminal head of large concentrated mass and regular configuration, the cooperating terminal heads being spaced from each other longitudinally of said container and centrally thereof, a body of mercury movable to and from said terminal heads for making and breaking the circuit at said terminal heads, and an inert gas filling said container that serves to preclude excessive concentration of heat at said terminal heads.

10. A mercury electric switch comprising an elongated hermetically sealed glass container, cooperating electrodes disposed at one end thereof and spaced from each other longitudinally of said container and hermetically sealed therein, said electrodes being provided with terminal heads of large concentrated mass and regular configuration, a body of mercury movable to and from contact with said terminal heads whereat the electric circuit is made and broken, and an inert gas filling said container, one of said electrodes being supported adjacent to its terminal head by a glass shank formed integrally with said container.

11. An electric switch comprising an hermetically sealed tubular glass container, a body of mercury therein, electrodes disposed at one end of said container and spaced from each other longitudinally thereof and from the walls of said container, leading-in wires extending from said electrodes and hermetically sealed through the wall of said container, the terminal heads of said electrodes being of substantially large concentrated mass and of regular configuration to provide electric contact-making areas at said heads and said leading-in wires for said heads being of relatively small diameter and low heat conducting capacity, said body of mercury being movable to and from contact with said terminal heads for making and breaking the electric circuit thereat.

In testimony whereof, I have subscribed my name this 13 day of March, 1925.

LOUIS A. M. PHELAN.